United States Patent [19]
Dowty

[11] Patent Number: 5,279,254
[45] Date of Patent: Jan. 18, 1994

[54] EGG COLLECTOR HAVING SEPARATE CONTINUOUS FLEXIBLE BELTS OF BASKETS FOR EACH CAGE CONVEYOR

[75] Inventor: Larry D. Dowty, Syracuse, Ind.

[73] Assignee: CTB, Inc., Milford, Ind.

[21] Appl. No.: 903,170

[22] Filed: Jun. 24, 1992

[51] Int. Cl.⁵ .............................................. A01K 31/17
[52] U.S. Cl. .................................. 119/48; 198/803.13
[58] Field of Search ............................. 119/48, 21, 22; 198/415, 435, 449, 801, 803.13, 803.14, 607

[56] References Cited

U.S. PATENT DOCUMENTS

| | | | |
|---|---|---|---|
| 2,707,924 | 5/1955 | Hansen | 198/415 |
| 3,166,175 | 1/1965 | Kurtz et al. | 198/801 |
| 3,626,905 | 12/1971 | Giesbest et al. | 119/48 |
| 3,672,485 | 6/1972 | Walters | 119/48 |
| 3,770,107 | 11/1973 | Michelbach | 198/803.14 |
| 3,789,802 | 2/1974 | Conley | 119/48 |
| 4,159,696 | 7/1979 | Martin | 119/48 |
| 4,345,682 | 8/1982 | White et al. | 198/801 |
| 4,846,337 | 7/1989 | Kühlmann | 119/48 |
| 5,002,016 | 3/1991 | de Vrieze | 119/48 |
| 5,058,749 | 10/1991 | Jong | 198/415 |

FOREIGN PATENT DOCUMENTS

| | | | |
|---|---|---|---|
| 2235767 | 2/1974 | Fed. Rep. of Germany | 119/48 |
| 8002232 | 11/1981 | Netherlands | 119/48 |
| 2224986 | 5/1990 | United Kingdom | 198/415 |

Primary Examiner—Gene Mancene
Assistant Examiner—Todd E. Manahan
Attorney, Agent, or Firm—Trexler, Bushnell, Giangiorgi & Blackstone

[57] ABSTRACT

An egg collection device for collecting eggs from an array of confinement cage rows comprises separate continuous flexible belts of individual, interchangeable basket members themselves linking together to form the egg collector. Each individual basket member includes a pair of sidewalls for containing the egg transported therein. This unique design enables the separate continuous flexible belts forming the egg collector to be spaced apart to conform to the spacing between the confinement cage rows with which the collector is being used, thereby making the collector adaptable to a wide variety of cage arrangements. Another improvement is directed to the manner in which the individual continuous flexible belts are driven and provides for a sprocket wheel which does not protrude into the basket member carrying the eggs.

14 Claims, 7 Drawing Sheets

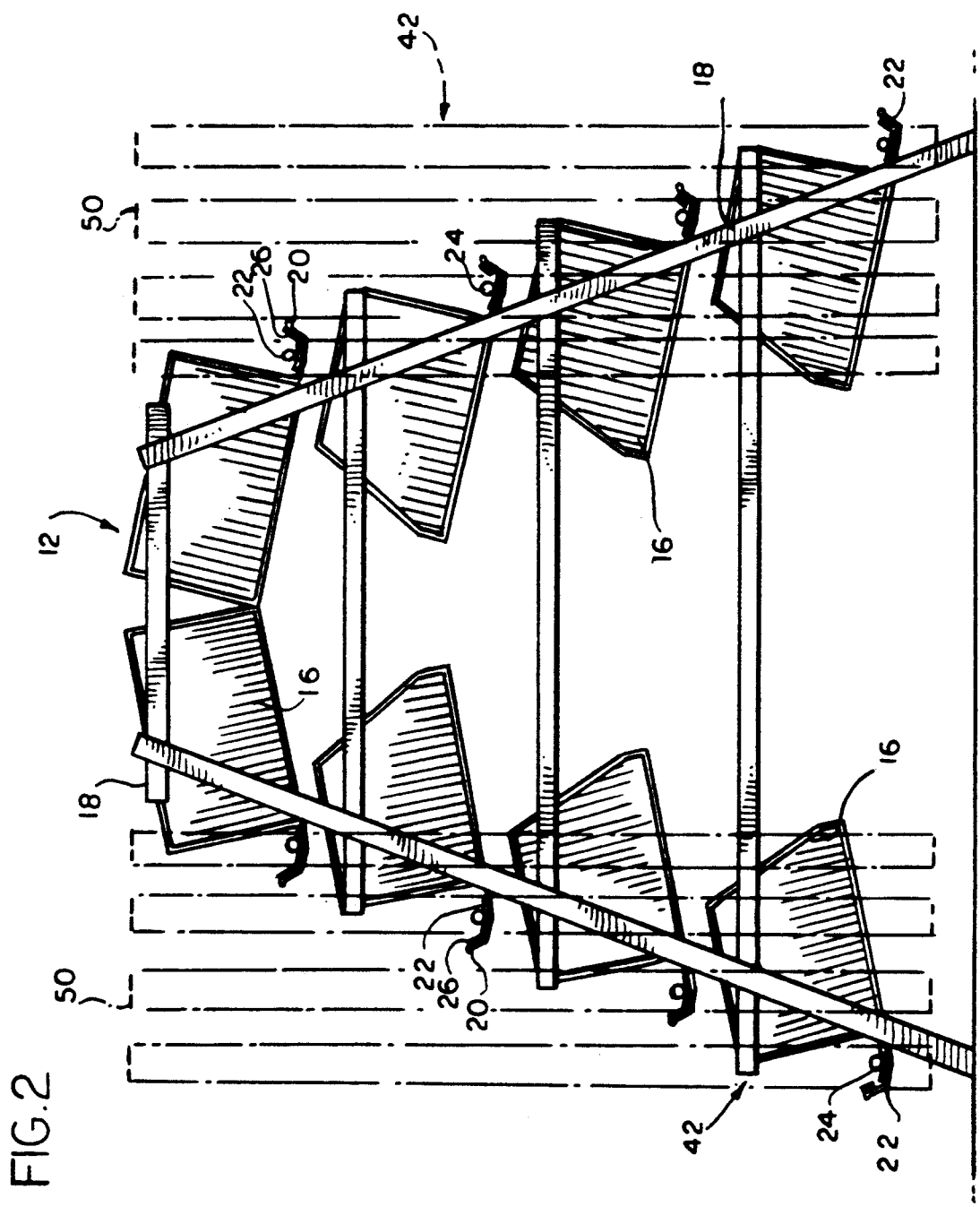

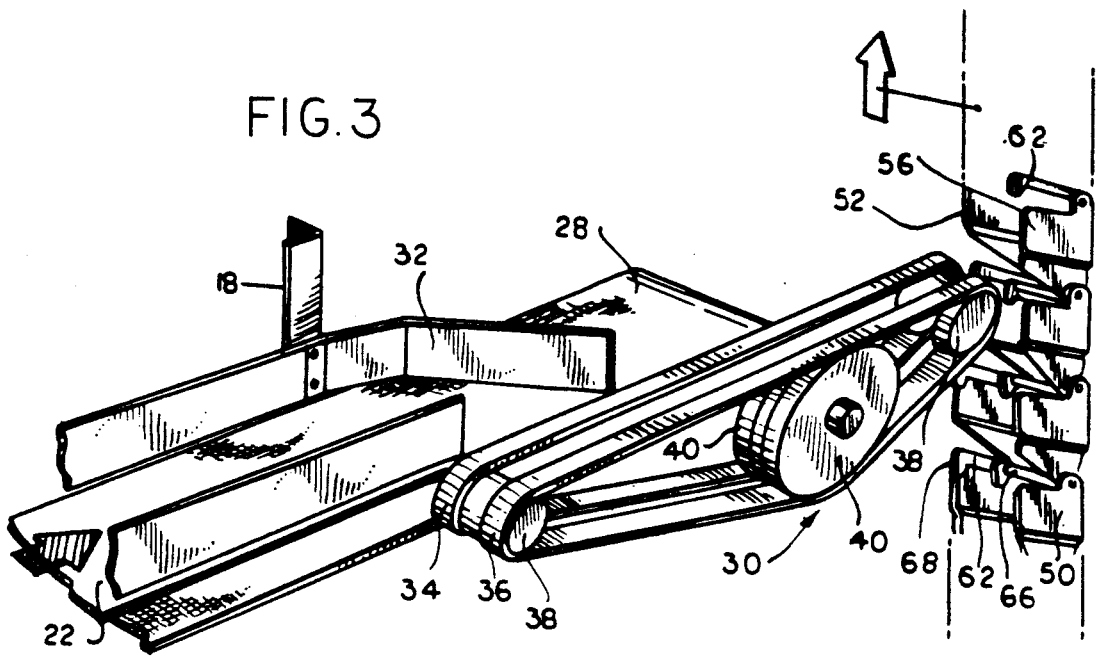
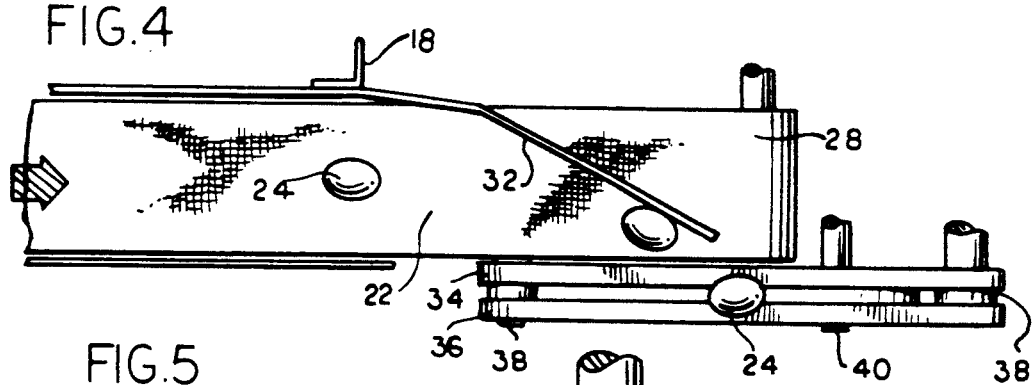
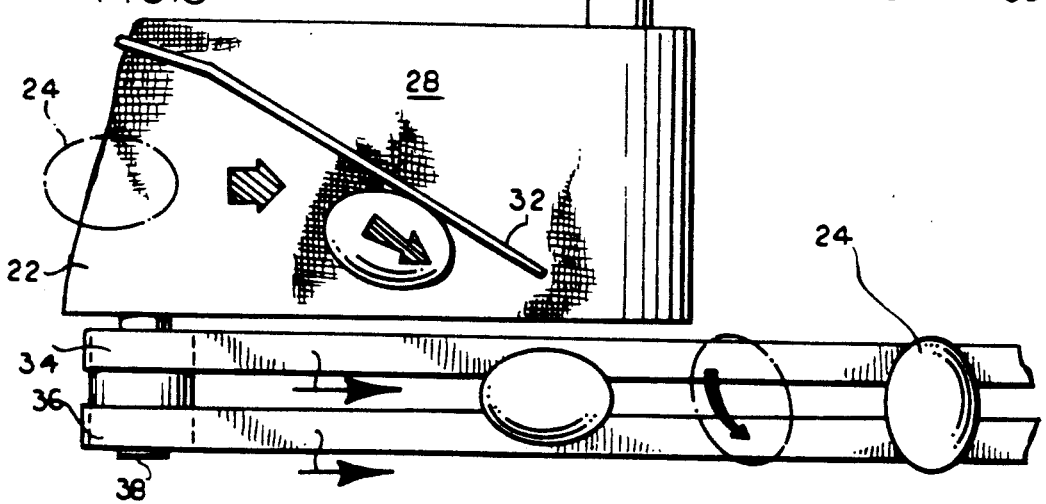

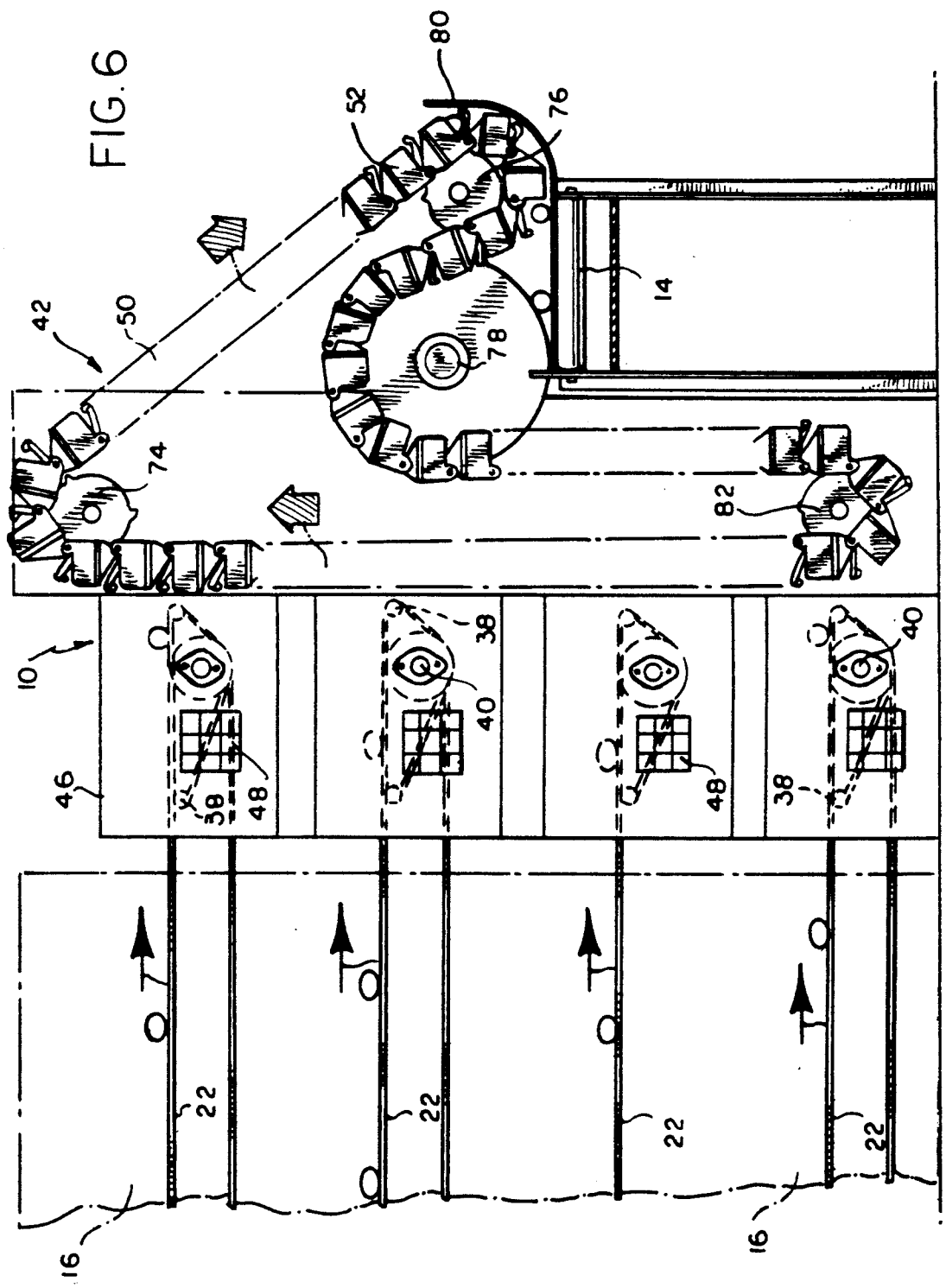

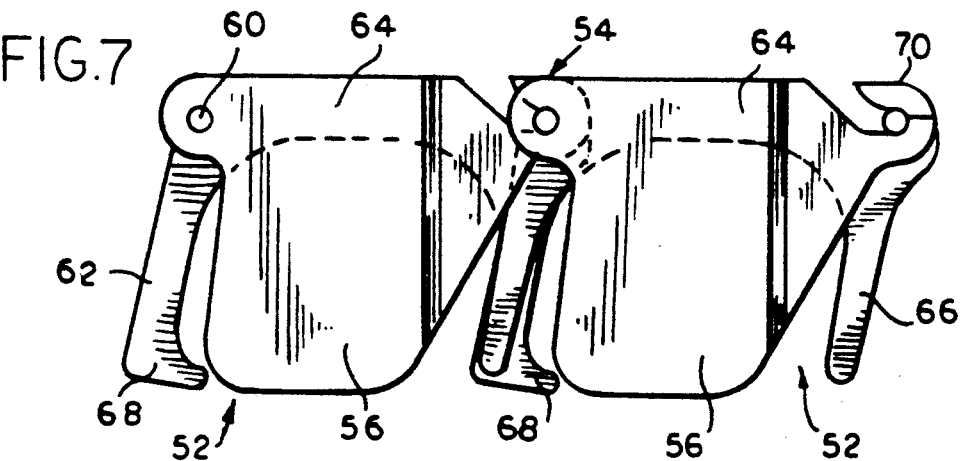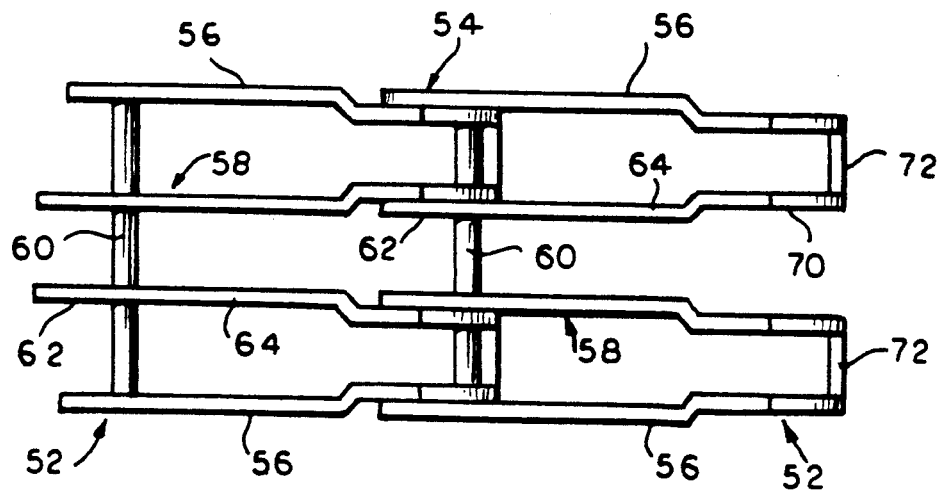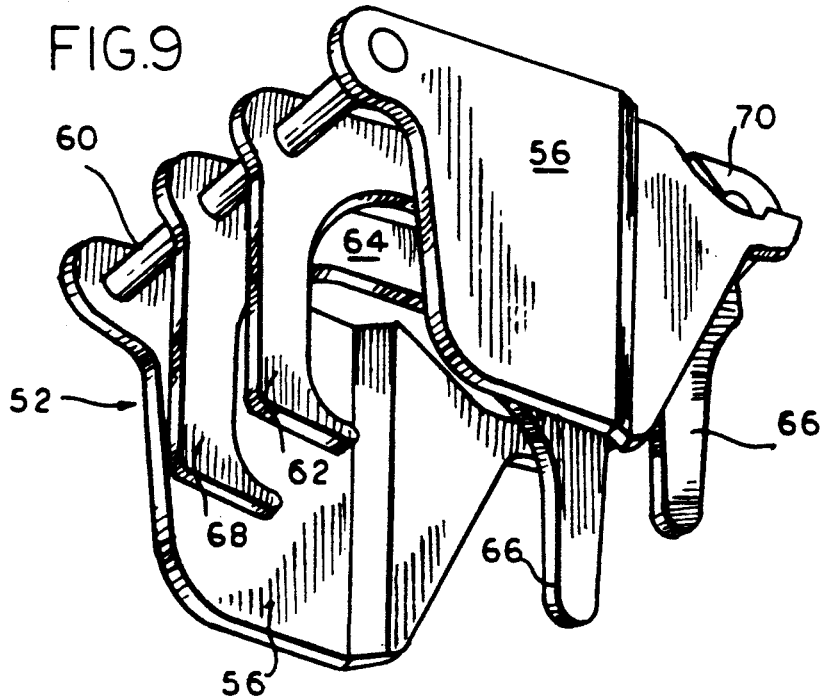

EGG COLLECTOR HAVING SEPARATE CONTINUOUS FLEXIBLE BELTS OF BASKETS FOR EACH CAGE CONVEYOR

BACKGROUND OF THE INVENTION a. Field of the Invention

In general, this invention relates to devices for the collection of eggs, on a commercial basis, from an array of poultry cages. More specifically, however, this invention relates to significant improvements in apparatus comprising a vertical egg collector which greatly reduces the risk of damage to the eggs during the collection process, thereby substantially increasing productivity.

b. Description of the Related Art

Egg collection apparatus of the general type and kind disclosed by the present invention is also seen in U.S. patent application Ser. No. 587,668, U.S. Pat. No. 5,002,016 and certain other references cited therein. However, none of this prior art discloses, nor makes obvious the unique combination of elements presented and claimed herein. As a result, no prior art, nor combination thereof, solves the problems resolved by the present invention.

In general, devices of this type are utilized to efficiently collect eggs delivered by a series of cage conveyors associated with an arrangement of confinement cages. Once collected, the eggs are delivered to a cross conveyor which carries the eggs away for further processing, packaging and eventual shipping. During the collection process, however, contact between the eggs themselves, and with the handling equipment necessarily occurs and can cause severe damage and marking to the eggs which, unless controlled, can significantly impact the productivity of the laying operation. For example, prior are devices of this type necessarily require some means of removing the individual eggs from the main collector belt and depositing them onto the cross conveyor. In the device disclosed by U.S. Pat. No. 5,002,016 and others, this equipment comprises a removal plate (reference numeral 17 in the '016 patent, see column 7, lines 31-38) having tines or fingers which dislocate the eggs from the main collector belt and onto the cross conveyor.

Similarly, the transfer of the eggs from the conveyors associated with the cage configuration into the main collector belt, in most cases, involves contact between adjacent eggs on the cage conveyors and the equipment used to effectuate the transfer. Moreover, movement of the eggs within the individual compartments of a main collector belt, and the resulting contact with the conveyor elements can also be excessive depending on the random orientation of the eggs within the individual compartments of the collector belt. This too can cause severe damage and marking to the eggs and reduce productivity dramatically.

Other drawbacks accompanying the prior art devices of this type and kind include difficulties associated with the servicing and replacement of the main collector belt. In addition, the prior art devices have a relatively narrow range of adaptability to the various types of cage configurations used in the industry.

OBJECTS AND SUMMARY OF THE INVENTION

Accordingly, it is a general objective of the present invention to provide an improved egg collector for significantly reducing the amount of damage caused to the eggs during the collection process.

It is an underlying objective of the present invention to provide an egg collector including one or more single continuous flexible belts of basket members for transporting eggs between a cage arrangement and a cross conveyor.

It is an associated objective to provide an egg collector including means for inverting the basket members forming the flexible belt above the cross conveyor so as to cause the eggs carried in the basket members to gently fall by gravitation ultimately onto the cross conveyor.

Another objective of the present invention is to provide a flexible belt of basket members which includes individual, interchangeable basket members, each having integral linking means for removably coupling with one another and being sized to accommodate only a single egg.

Still another objective of the present invention is to provide component means to assure proper positioning and orientation of the eggs during the collection process.

Other objects and advantages of the invention will become apparent upon reading the following detailed description and upon reference to the drawings. Throughout the description, like reference numerals refer to like parts.

Briefly, and in accordance with the foregoing objects, the present invention is an egg collector which is operatively associated with, and located between an arrangement of poultry cages on one side, and a cross conveyor on the other. Once collected and deposited on the cross conveyor, the eggs are transported to a processing department for quality control, packaging and shipping procedures. The arrangement of poultry cages has cage conveyors associated with each level of cages whereupon the eggs from the individual cages are deposited and delivered to the egg collector.

The egg collector comprises a single continuous flexible belt of basket members for each cage conveyor associated with the cage arrangement, operating alone, or in combination with additional single belts. Each basket member is dimensioned to accommodate only one egg and each single continuous belt of basket members collects eggs from only one cage conveyor. The egg collector also includes reversing means for guiding the flexible belt, or belts, past a first point at which the eggs from the cage conveyors are collected and retained by the basket members, and a second point at which the eggs are released from the basket members, and ultimately delivered to the cross conveyor. Preferably, a unique sprocket wheel for engaging the flexible belts and driving them past the first and second collection and delivery points, respectively, is also included.

Importantly, the egg collector further comprises inverting means for threading the flexible belt of basket members into a pattern which causes the eggs carried therein to gently fall by gravitation ultimately onto the cross conveyor, without the need for supplemental equipment to remove the eggs from the baskets. A plastic shield whereupon the eggs are first delivered and which thereafter guides the eggs onto the cross conveyor is also preferably provided.

The present invention further includes individual, interchangeable basket members, each having integral linking means for removably coupling with other basket members in the flexible belt, and each being dimensioned to accommodate only a single egg. Lastly, the illustrated embodiment includes component means for insuring a proper orientation for the individual eggs at the point at which the eggs are deposited into the basket members of the flexible belt. It should also be noted that the present invention is most suitably used in conjunction with an arrangement of poultry cages having an A-frame configuration, however, its use is certainly not limited to such an arrangement of poultry cages.

BRIEF DESCRIPTION OF THE DRAWINGS

The features of the present invention which are believed to be novel are set forth with the particularity in the appended claims. The organization and manner of operation of the invention, together with further objects and advantages thereof, may best be understood by reference to the following descriptions taken in connection with the accompanying drawings, in which:

FIG. 2 is an elevational view of an A-frame cage configuration illustrating the individual continuous flexible belts of basket members in dashed-lines;

FIGS. 3-5 illustrate a component of the present invention which effectuates transfer of the eggs from the cage conveyors to the single continuous flexible belts of basket members;

FIG. 6 is an elevational view of the present invention shown in working association with a cage arrangement and a cross conveyor, as in FIGS. 1 and 2;

FIGS. 7-9 illustrate side, top and perspective views, respectively, of the individual, interchangeable basket members forming the single, continuous flexible belt of basket members;

DETAILED DESCRIPTION OF THE ILLUSTRATED EMBODIMENT

Figure 1:
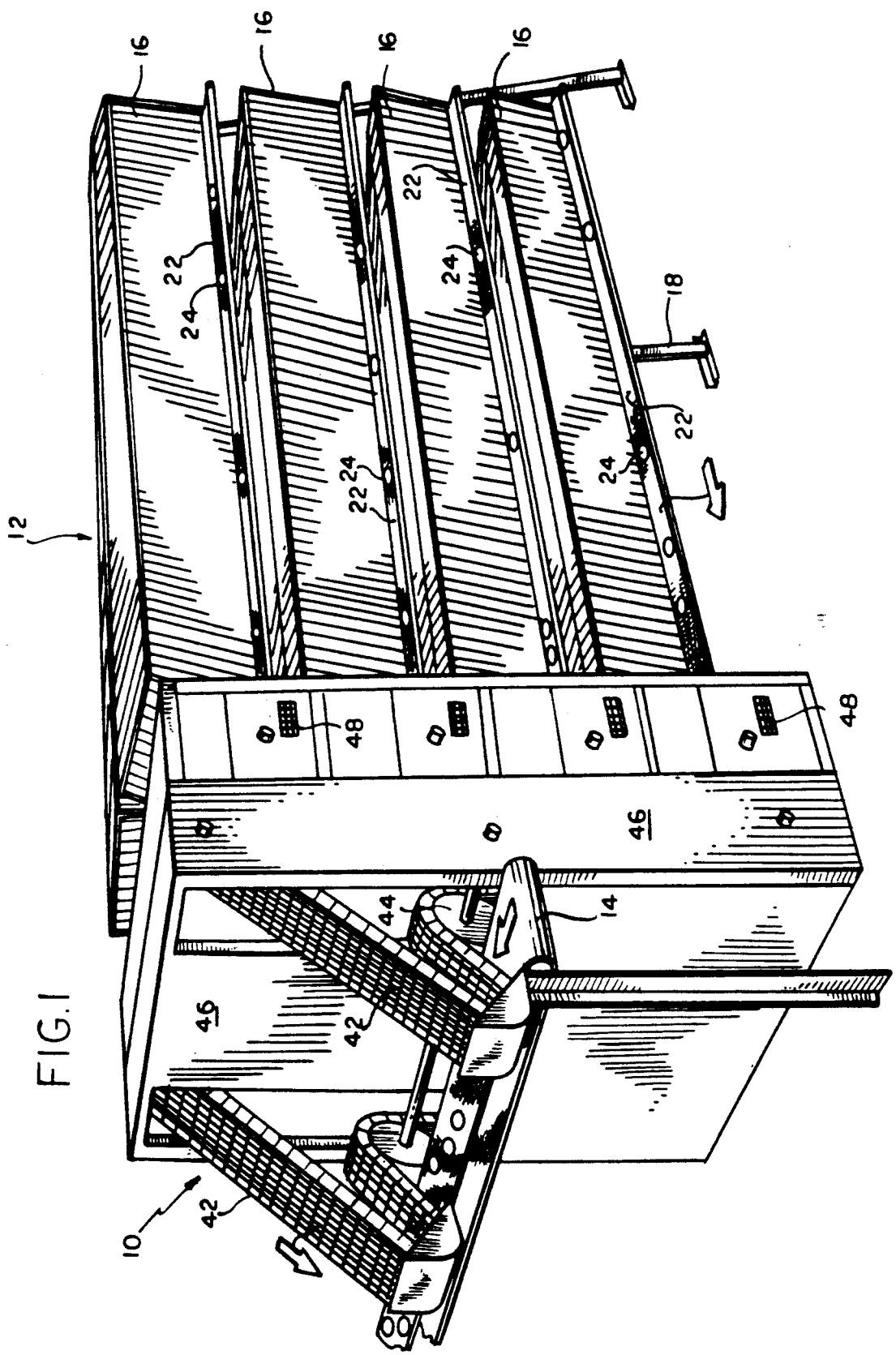
FIG. 1 is a perspective view illustrating the present invention in working association with a cage array and a cross conveyor.

Referring now to the drawings, and initially to FIG. 1, apparatus in accordance with the present invention is designated generally by reference numeral 10, and is illustrated in operative association with an array of confinement cages 12, and a cross-conveyor 14. The cross conveyor 14 can be placed at any height desired to suit a variety of poultry house arrangements. The confinement cage array 12, as best seen in FIG. 2, includes individual rows of cages 16 mounted one above the other on each side of an A-frame support 18. Each row of cages 16 further includes a floor extension 20 for guiding a cage conveyor 22 whereupon eggs 24, after descending down the cage floors, are deposited. Movement of the cage conveyors 22 is in the direction of the arrow shown in FIG. 1. Again referring to FIG. 2, and as discussed in greater detail in U.S. Pat. No. 4,226,211 at column 2, line 54 through column 3, line 6 (incorporated herein by reference), it is seen that the floor extensions 20 are provided with bumper strips 26 to prevent damages to the eggs 24 upon arrival at the cage conveyors 22. Once deposited on the cage conveyors 22, the eggs 24 are normally carried and retained at approximately the center of the cage conveyor 22 with the major axes of the eggs 24 orientated parallel to the lengthwise direction of movement of the cage conveyors 22. This positioning and orientation is due in large part to the shallow V-like shape of the floor extensions 20 in which the cage conveyors 22 travel.

Now referring to FIGS. 3-5, it is seen that the eggs 24 on the cage conveyors 22 are transported to a remote end 28 of the cage conveyors 22 whereupon they are diverted onto a band and pulley device 30. Deflection of the eggs 24 takes place by means of a sweep 32 which leads the eggs 24 onto the band and pulley device 30 as shown. A more detailed description of the transfer of the eggs 24 off of the cage conveyor 22 is described in U.S. patent application No. 587,668 beginning at page 6, which is hereby incorporated by reference, and therefore omitted.

In accordance with a first significant aspect of the present invention, however, it is important to note that each of the eggs 24 (as does any other generally elliptical shape) normally has both a major axis, and a minor axes. When the eggs 24 are first diverted onto the band and pulley device 30, the eggs are orientated such that their major axes are parallel to the direction of travel of the cage conveyors 22, as best shown in FIG. 5. This parallel orientation is caused, as discussed briefly above, as a result of the design and arrangement of the cage conveyors 22, the floor extensions 20, in addition to the manner of diversion of the eggs 24 off of the cage conveyors 22 by the sweep 32. In order to substantially reduce the risk of damage to the eggs 24, however, it is most advantageous to have the eggs 24 positioned such that their major axes are perpendicular, rather than parallel, to the direction of travel of both the cage conveyors 22 and the band and pulley device 30 when the eggs 24 move off the band and pulley device. To this end, the band and pulley device 30 includes two separate belts 34 and 36 separately mounted for rotation on idlers 38 and drive pulleys 40. Importantly, the separate belt 34 nearest the cage conveyor 22 is rotated at a different speed than the separate belt 36 located farthest from the cage conveyor 22. Specifically, the belt 34 nearest the cage conveyor 22 runs at approximately 110% of the speed of the cage conveyor 22, while the belt 36 farthest from the cage conveyor 22 runs at approximately 115% of the speed of the cage conveyor 22. Again, however, these speeds are not so limited and can be varied to accomplish the same result. Operation of the band and pulley device 30 at a speed greater than that of the cage conveyor 22, as also discussed in U.S. patent application Ser. No. 587,668, promotes single-file transfer of the eggs 24 from the cage conveyor 22 onto the band and pulley device 30. Conventional speed changing devices for adjusting the speed of rotation of the cage conveyors 22, and the separate belts 34 and 36 of the band and pulley device 30 are well known in the art and are therefore not discussed in detail here.

As a result of this arrangement, it is seen in FIGS. 4 and 5 that as the eggs 24 progress along the band and pulley device 30, their directional orientation rotates from having their major axes substantially parallel to the direction of travel of the band and pulley device 30, to having their major axes substantially perpendicular to the direction of travel of the band and pulley device 30. That is, the eggs 24 are rotated approximately 90° during their course of travel on the band and pulley device 30.

Now referring for a moment back to FIG. 1, the remainder of the invention apparatus 10 is shown to include two groups 42 of continuous flexible basket belts threaded about a series of reversing rollers 44 (only one in each group 42 shown in FIG. 1) in a unique arrangement. Further, a housing 46 is provided for enclosing the hidden portions of the basket belt groups 42 and the band and pulley devices 30, discussed above. Clean-out screens 48 are also provided in the housing 46 below each band and pulley device 30 to furnish access to feathers and other debris which are collected after falling between the separate belts 34 and 36 of the band and pulley device 30. It should be understood that the invention as illustrated includes two groups 42 of basket belts but it is not the intent of the applicant to limit the scope of the invention to such an embodiment. Rather, the illustrated embodiment including the two groups 42 of basket belts simply best suits the A-frame confinement cage array 12 shown.

Now more specifically, and with reference to FIG. 2, it is seen that each group 42 of flexible basket belts is made up of multiple columns of single continuous flexible belts of basket members 50 such that each column lines up with and collects eggs from only one cage conveyor 22. Upon inspection to FIGS. 3 and 6, it should be readily apparent that each column 50 comprises individual basket members 52 which accept eggs 24 from the band and pulley devices 30 and thereafter retain and transport the eggs 24 upward. The details of the design and construction of the individual basket members 52, which represent yet another significant aspect of the present invention, are most-easily understood upon reference to FIGS. 7-9. As illustrated, each basket member 52 constitutes an integral, interchangeable egg transfer device including linking means 54 for removably coupling with other individual basket members 52 forming each continuous flexible column 50. Each basket member 52 further comprises two side walls 56, two generally C-shaped retainers 58 and a beam 60 for maintaining the positional relationship of these component members substantially as shown.

Each C-shaped retainer 58 includes three legs, namely, a bent leg 62, a rear leg 64 and a straight leg 66. As illustrated in FIG. 3, the bent legs 62 function as a ceiling for the basket member 52 at, among other times, the point when the eggs 24 are accepted into the basket members 52 from the band and pulley device 30. To prevent the eggs 24 from rolling out of the basket members 52 during the course of travel described below, the bent legs 62 are therefore preferably provided with a rib 68 at a free end thereof. Additionally, near the intersection between the straight leg 66 and the rear leg 64, the straight leg 66 includes an inverted hook 70 which, together with a beam 60 of an adjacent basket member 52, comprise the unique linking means 54 allowing each basket member 52 to removably couple with another basket member 52, and permitting the columns 50 to weave through the meandering course described below. Also, a stabilizer bar 72 is preferably provided between each side wall 56 and the C-shaped retainer 58 adjacent the hook 70. Finally, with respect to the design of the basket members 52, each side wall 56 and adjacent C-shaped retainer 58 are staggered inward, as best shown in FIG. 8, to facilitate mating with an adjacent basket member 52 and to increase the range of rotational motion between adjacent basket members 52.

As a result of the unique design of the basket members 52, no additional hardware such as hinge pins, bolts, etc. are required. Rather, the integral, interchangeable basket members 52 themselves link together to form a single continuous flexible column 50 which gently and efficiently moves the eggs 24 along their path. Consequently, serviceability is also facilitated. That is, when damage to a basket member 52 occurs, replacement merely entails snapping out the damaged member 52 and replacing it with a new one. No tools are required. Moreover, the basket belts 42 are easily adaptable to a variety of configurations of A-frame cage arrays 12 by simply adjusting the distances between continuous columns of basket members 50 and/or by adding columns 50 to match the number of tiers in the cage arrangement 12 in question. Independent operation of each basket belt 42 shown can also be accomplished.

Referring now to FIG. 6, a principal aspect of the invention is illustrated. Upon close inspection of FIG. 6, it can be seen that the eggs 24 move along the cage conveyors 22 and are transferred to the band and pulley devices 30 as previously described. The band and pulley devices 30 rotate the eggs 24 approximately 90° to attain an optimum orientation for acceptance into the appropriate continuous column of basket members 50. That is, the eggs 24 are positioned horizontally across the separate belts 34 and 36 and then are gently and steadily lifted by the pair of straight legs 66 of each basket member 52. Thereafter, the eggs 24 are carried upward toward and around an upper reversing roller 74. The unique design and coupling between basket members 52 by way of the hooks 70 and beams 60, as discussed above, provides for the smooth and safe transport of the eggs 24 as they proceed downward at an approximately 45° angle toward an outer reversing roller 76. It should be understood, however, that this angle can range anywhere from 0° to 90°. During this portion of travel, the ribs 68 on bent legs 62 insure the retention of the eggs 24 in the basket members 52. Moreover, the side walls 56 of each basket member 52 eliminate the possibility of the eggs falling out to the right or left and also prevent debris from entering the basket members 52 in those directions.

Due to the positional arrangement of the outer reversing roller 76 in combination with an inner reversing roller 78, and in keeping with one of the principal objects of the present invention, the basket belts 42 are next threaded up and around the inner reversing roller 78 thereby causing the basket members 52 to become inverted, and causing the eggs 24 formerly retained thereby to roll out and ultimately onto the cross conveyor 14. To provide a smooth transition between the inverted basket members 52 and the cross conveyor 14, however, a shield 80 is preferably provided. As shown in enlarged, isolated view in FIG. 10, the shield 80 forms an arc radially outward of the path of the basket belt 42 as it proceeds around the outer reversing roller 76. The shield 80 extends from approximately the top of the outer reversing roller 76 downward past the bottom thereof and terminates in close proximity with the cross conveyor 14. The shield 80 is best formed of a plastics material to cushion the eggs 24 descending therealong, but could be constructed of any suitable soft material.

Figure 10:
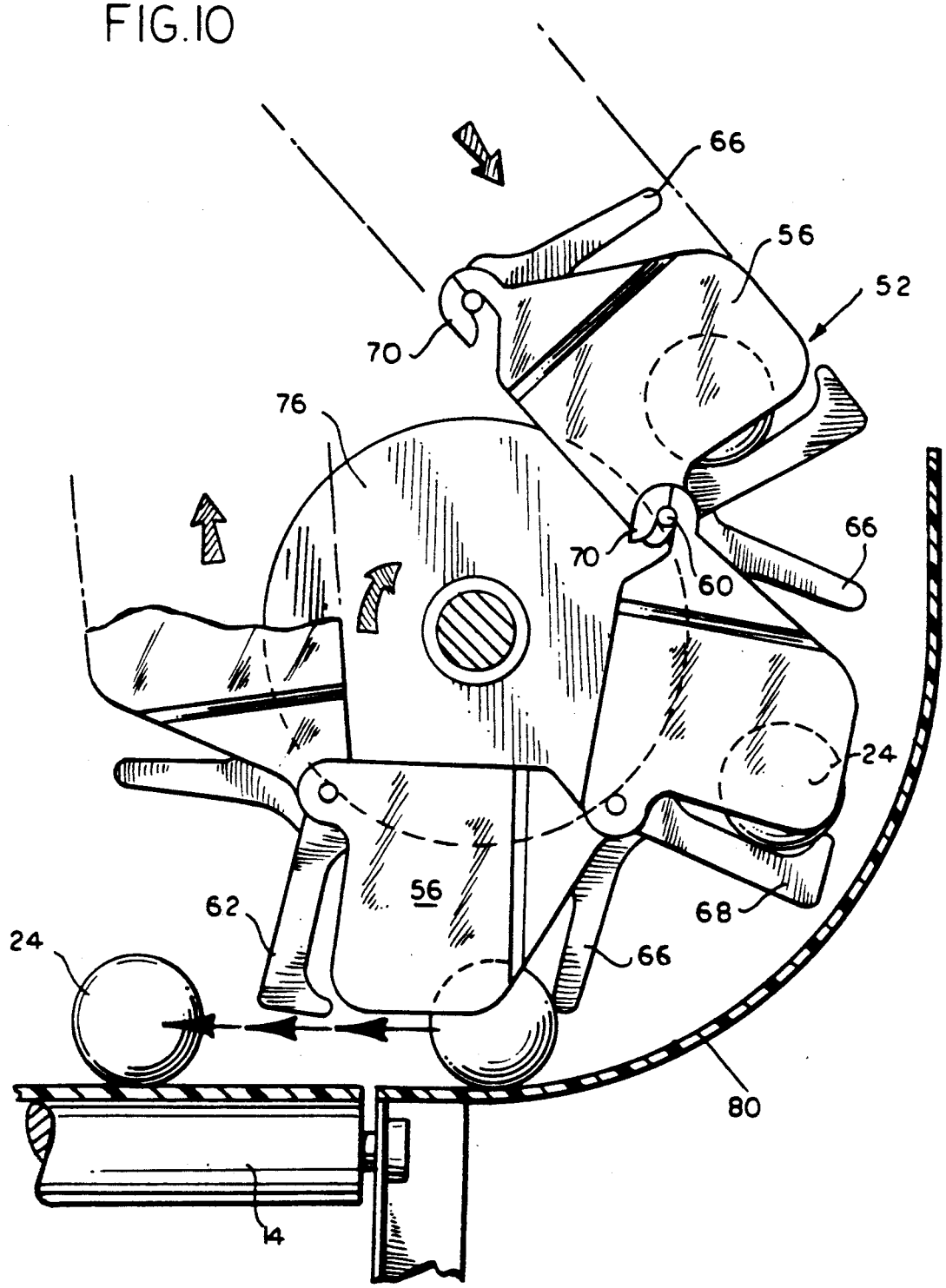
FIG. 10 is a partial side view of the present invention at the point of transfer from the flexible belt of basket members to the cross conveyor.

Still referring to FIG. 10, it can also be seen that the unique design of the basket members 52 further serves to efficiently promote and control the transfer of the eggs 24 from the belts 42 to the cross conveyor 14. Specifically, as the basket members 52 become inverted at approximately the bottom of the outer reversing roller 76, the eggs 24 roll out onto the shield 80 and, in some cases are thereafter urged toward and onto the cross conveyor 14 by the trailing straight leg component 66 of each basket member 52. In other cases, rapid motion of the eggs 24 onto the cross conveyor 14 is prevented by the bent leg 62 of the basket member 52 from which the egg 24 came. The components of the basket member 52 therefore work together to control movement of the eggs 24 on the shield 80. Once on the cross conveyor 14, the eggs 24 are conveyed to a central processing department for packing and shipping.

As illustrated in FIG. 6, the unique design of the basket members 52 also advantageously allows the basket belts 42 to continue to wind their way around the inner reversing roller 78 and downward toward a lower reversing roller 82. That is, only because of the "staggered inward" design of the sidewalls 56 and adjacent C-shaped retainers 58, as discussed above in conjunction with FIGS. 8-9, can the neighboring basket members 52 wrap around the inner reversing roller 78 and continue downward toward the lower reversing roller 82 as shown in FIG. 6.

Figure 11:
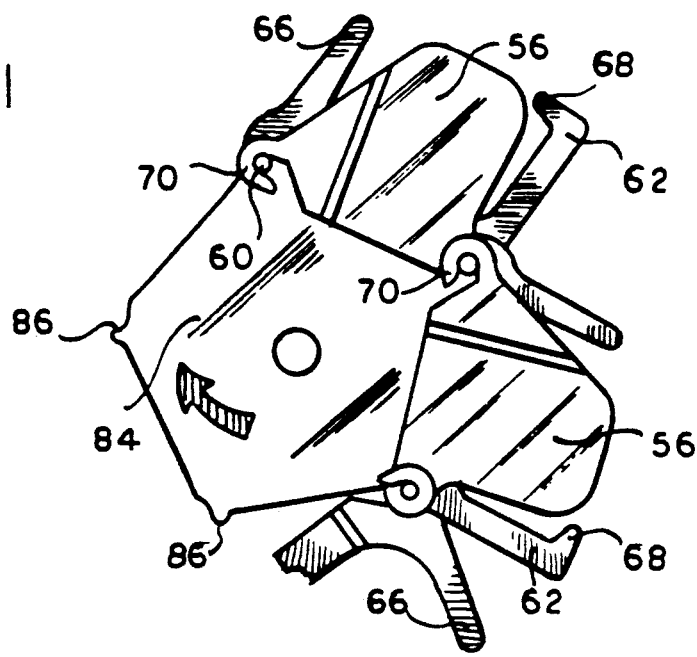
FIGS. 11-13 illustrate a unique sprocket wheel aspect of the present invention.
Figure 12:
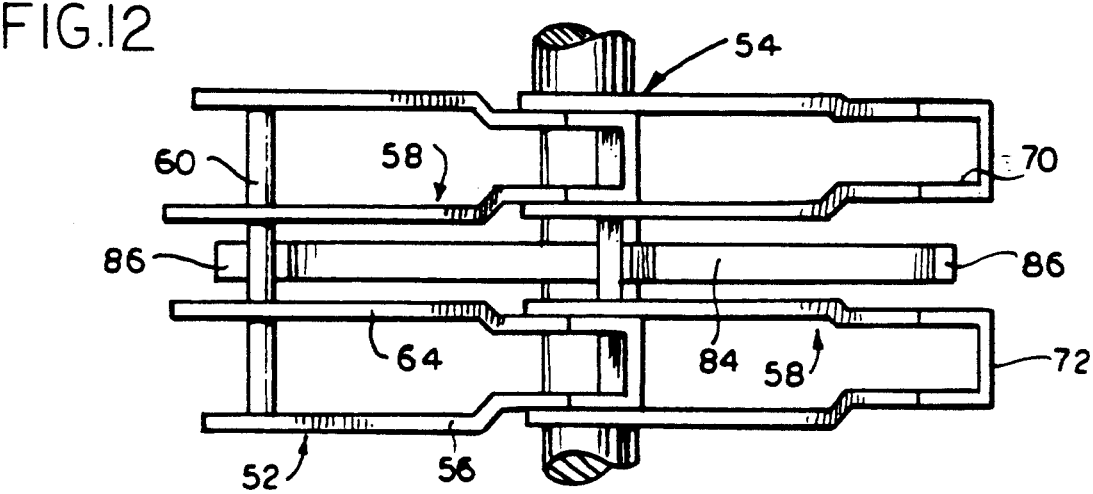
Figure 13:
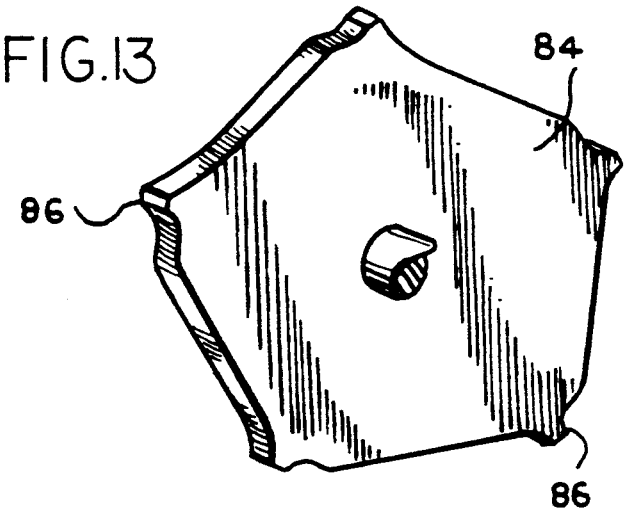

In accordance with still another important aspect of the present invention, at least one of said reversing rollers 44 is provided with a sprocket wheel 84 as illustrated in FIGS. 11-13. The sprocket wheel 84 includes teeth 86 designed as shown to engage the beams 60 of the basket members 52, while not protruding into the basket members 52. Consequently, the unique design of the sprocket wheel 84 permits the basket belts 42 to be driven along the path described without risking damage to the eggs from the drive mechanism. A conventional electric motor and gearing can be used to drive the sprocket wheel 84 and will not be discussed in detail. It should be obvious to one skilled in the art that driving the basket belts 42 can be accomplished by driving any one or more of the reversing rollers 74, 76, 78 and 82. Moreover, it should be clear that those rollers not-driven (i.e., idlers) could be substituted with non-rotating guide means.

It should be understood that while the invention has been described in connection with a preferred embodiment, it is not intended to limit the invention to that embodiment. On the contrary, it is intended to cover all alternatives, modifications and equivalents as may be included within the spirit and scope of the invention.

The invention is claimed as follows:

1. An egg collector operatively associated with, and positioned between an arrangement of confinement cage rows spaced apart in vertical tiers from one another, and a cross conveyor, each row of said confinement cage rows having a cage conveyor associated therewith for delivering eggs from individual cages within said confinement cage rows to said egg collector, said egg collector comprising: a plurality of separate continuous flexible belts of basket members, one for each cage conveyor provided, each of said basket members within each separate continuous flexible belt of said egg collector being dimensioned to accommodate only a single egg, and each basket member having two side walls for retaining eggs being transported thereby; reversing means for guiding each of said separate continuous flexible belts past a first point at which eggs from each cage conveyor are collected and retained by said basket members, and a second point at which eggs are released from said basket members and delivered onto said cross conveyor; each of said separate continuous flexible belts being adjustable for changing the distance between said separate continuous flexible belts of basket members to adapt said egg collector to the particular arrangement of confinement cage rows associated therewith, and; inverting means for threading each separate continuous flexible belt into a pattern which causes the eggs carried in said basket members to gently fall by gravitation onto said cross conveyor, thereby providing an effective and efficient manner of transporting eggs from said arrangement of confinement cage rows to said cross conveyor without subjecting said eggs to contact with any additional machinery.

2. An egg collector as recited in claim 1, further comprising a shield member located between said inverting means and said cross conveyor for guiding said eggs falling from said basket members onto said cross conveyor.

3. An egg collector as recited in claim 2, wherein said basket members include straight leg members which gently urge said eggs deposited on said shield member onto said cross conveyor, and bent leg members which prevent eggs deposited on said shield member from moving too rapidly onto said cross conveyor.

4. An egg collector as recited in claim 1, wherein said reversing means includes sprocket wheels for individually driving said separate continuous flexible belts of basket members by engaging said basket members, without protruding into said basket members, between said two side walls of each basket member.

5. An egg collector as recited in claim 1, further comprising a band and pulley device for accepting eggs from each cage conveyor and rotating the directional orientation of said eggs for proper transfer into said basket members.

6. An egg collector as recited in claim 5, wherein said band and pulley device includes at least two separately driven belts operating at different speeds with respect to one another thereby causing a predetermined rotation of the eggs carried on said band and pulley device to occur.

7. An egg collector as recited in claim 1, wherein said basket members comprise individual, interchangeable baskets, each having integral linking means for removably coupling with other basket members in said flexible belt.

8. Egg collection apparatus comprising: at least two independent continuous flexible belts of basket members for collecting eggs from at least two cage conveyors arranged one above another in tiers, and delivering them to a cross conveyor; said independent continuous flexible belts being adjustable for varying a predetermined distance between said independent continuous flexible belts of basket members to conform said predetermined distance to a predetermined spacing between said cage conveyors; reversing means for driving and directing the movement of said independent continuous flexible belts initially past said cage conveyors for picking up eggs, and eventually past said cross conveyor for depositing eggs thereon, said reversing means including a sprocket member positioned in confronting relationship with each of said independent continuous flexible belts for imparting movement to said flexible belts by engaging said basket members without protruding into said basket members; wherein each of said independent continuous flexible belts of basket members includes individual, interchangeable basket members, each having integral linking means for removably coupling with other basket members in said flexible belts, and each being dimensioned to accommodate only a single egg.

9. Egg collection apparatus as recited in claim 8, wherein each basket member includes an unshared pair of side walls and each of said sprocket members engages said basket members between said unshared pair of side walls.

10. Egg collection apparatus as recited in claim 8, wherein said apparatus further comprises inverting means for causing each of said independent continuous flexible belts of basket members to meander through a pattern resulting in said basket members turning upside down thereby causing said eggs to gently fall by gravitation onto a plastic shield member and ultimately onto said cross conveyor.

11. Egg collection apparatus as recited in claim 10, wherein said basket members include at least one straight leg which gently urges said eggs deposited on said plastic shield onto said cross conveyor, and at least one bent leg which prevents said eggs deposited on said plastic shield from moving too quickly onto said cross conveyor.

12. Egg collection apparatus as recited in claim 8, wherein said linking means for removably coupling said basket members with one another comprises a beam member integrally formed on said basket members for removably coupling with a hook integrally formed on an opposite side of said basket members.

13. Egg collection apparatus as recited in claim 8, further comprising a band and pulley device for reorientating said eggs on said cage conveyor prior to entry into said basket members.

14. Egg collection apparatus as recited in claim 13, wherein said band and pulley device further comprises a series of separately driven belt members operating at various speeds for rotating said eggs into a predetermined position for proper entry into said basket members.

* * * * *